Dec. 30, 1941.　　　E. G. WILSON ET AL　　　2,268,521
THICKNESS MEASURING DEVICE
Filed Jan. 29, 1938　　　7 Sheets-Sheet 1
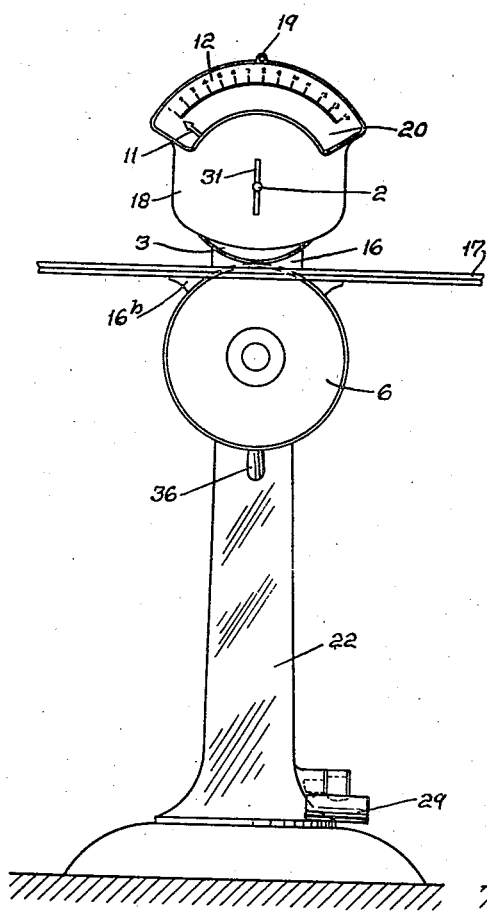
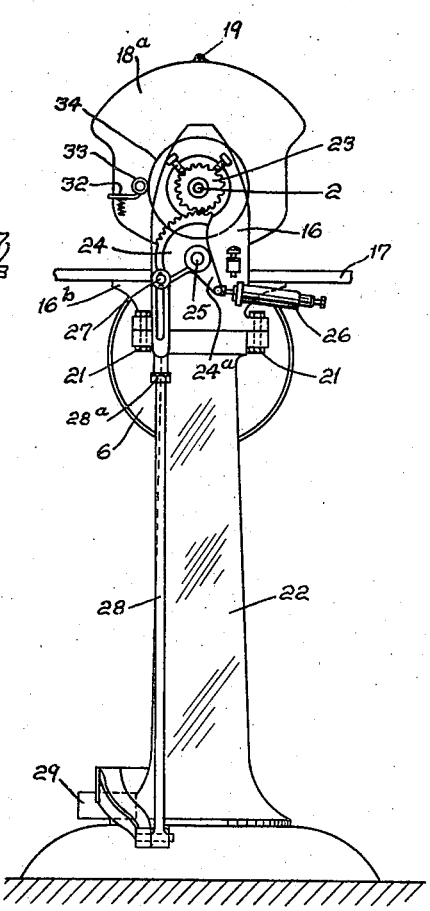
Inventors:
Kenneth L. Wilson & Evan G. Wilson.
By William C. Linton.
Atty.

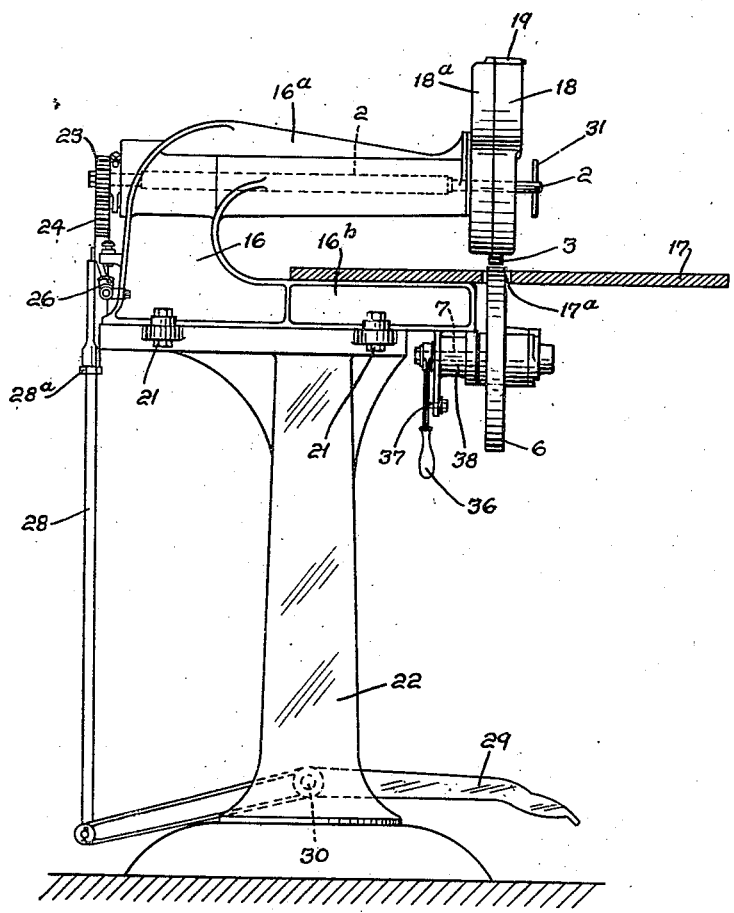

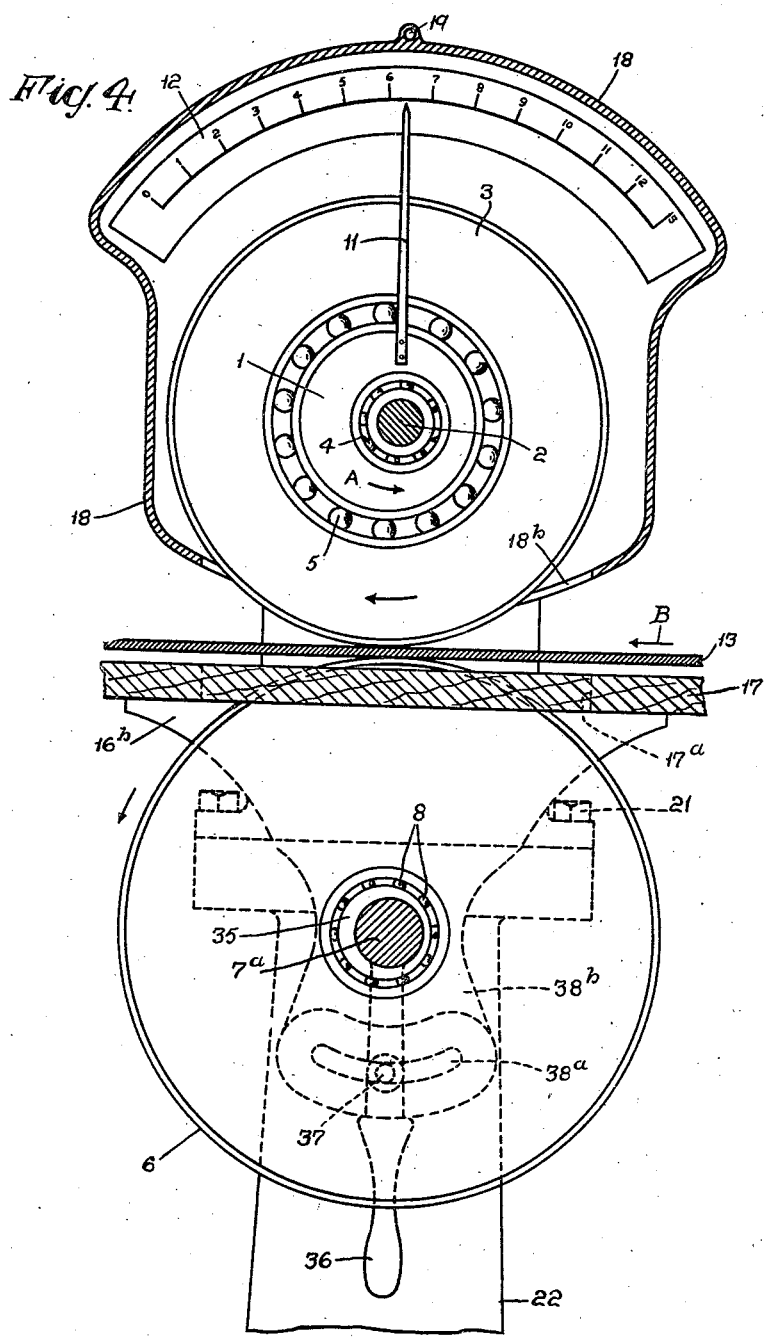

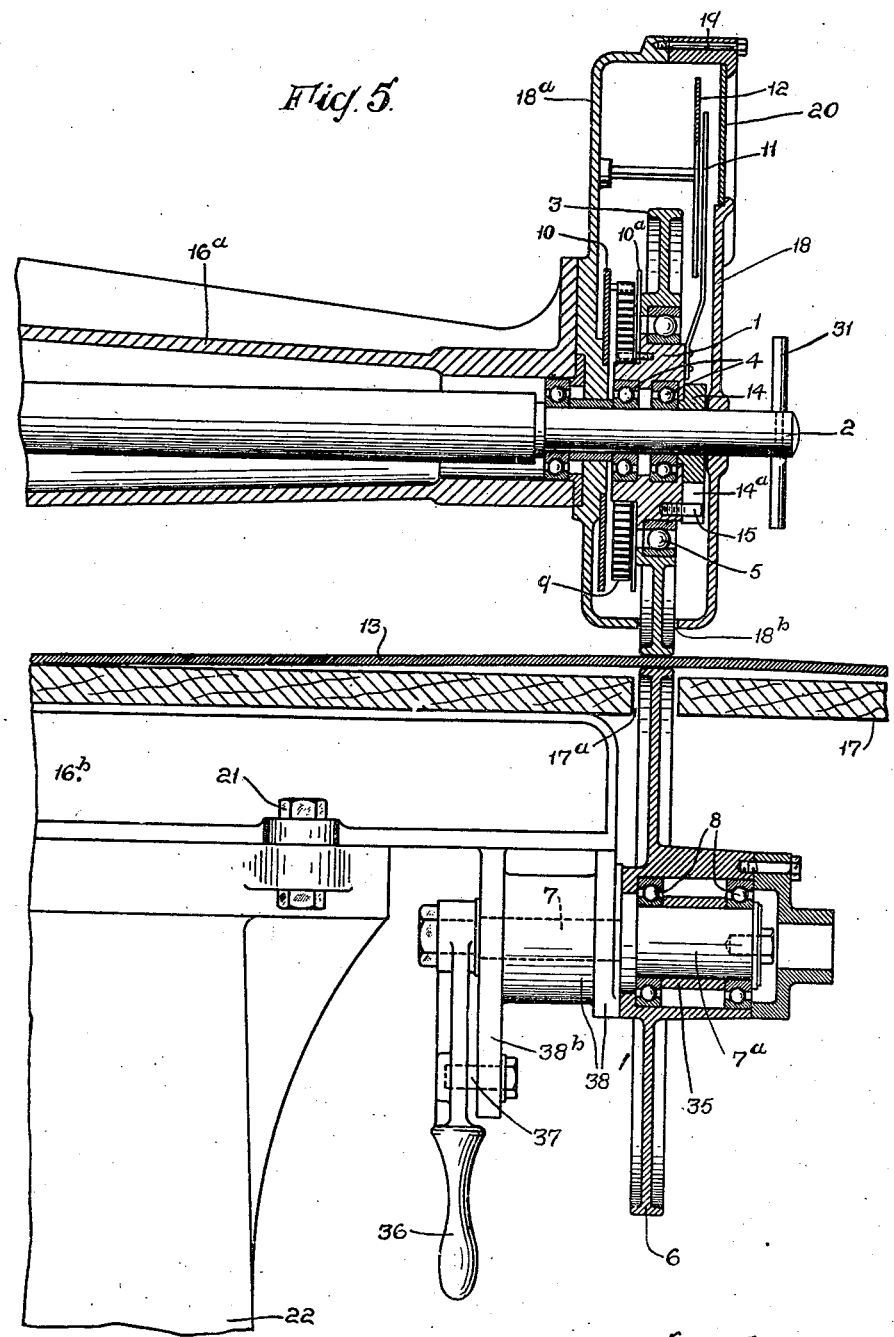

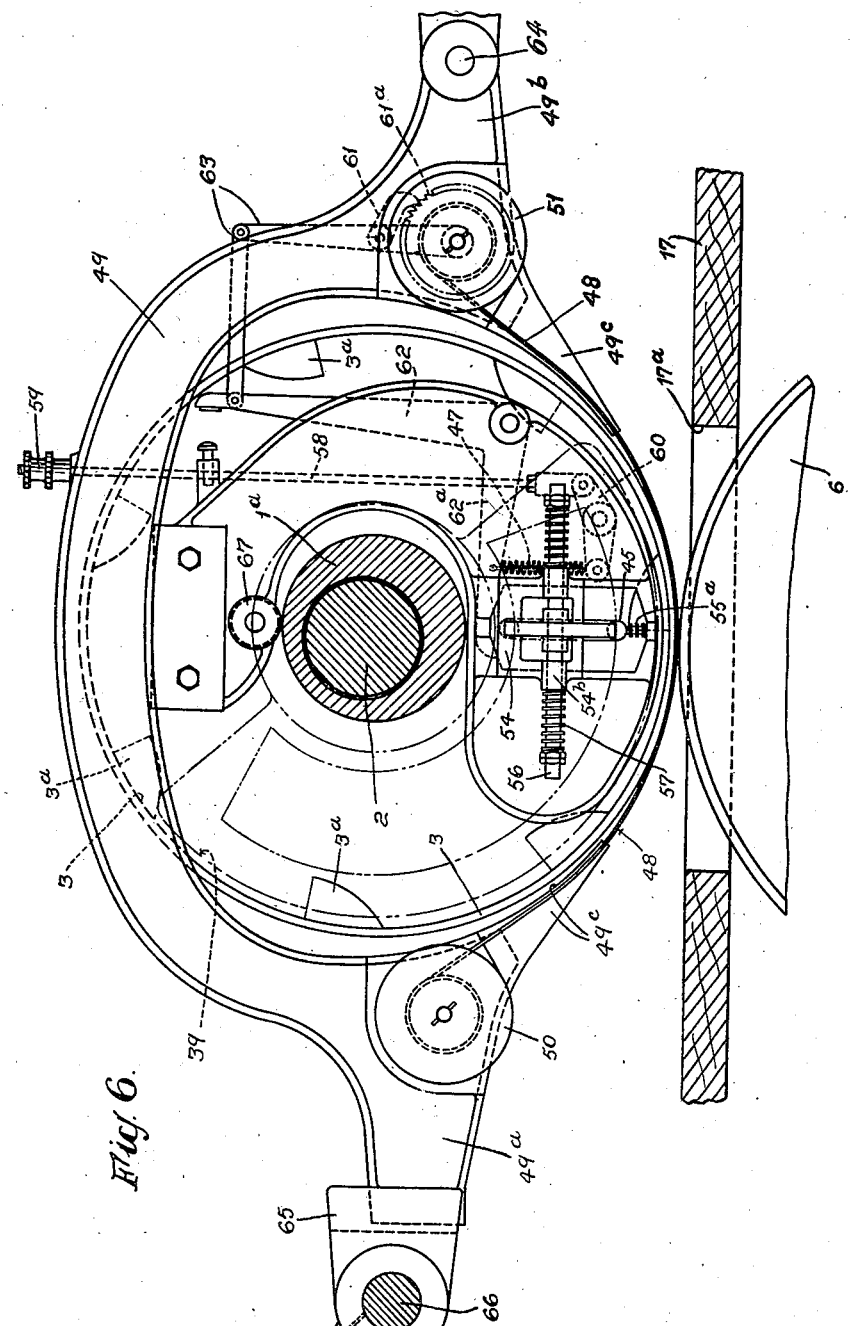

Dec. 30, 1941.    E. G. WILSON ET AL    2,268,521
THICKNESS MEASURING DEVICE
Filed Jan. 29, 1938    7 Sheets-Sheet 6
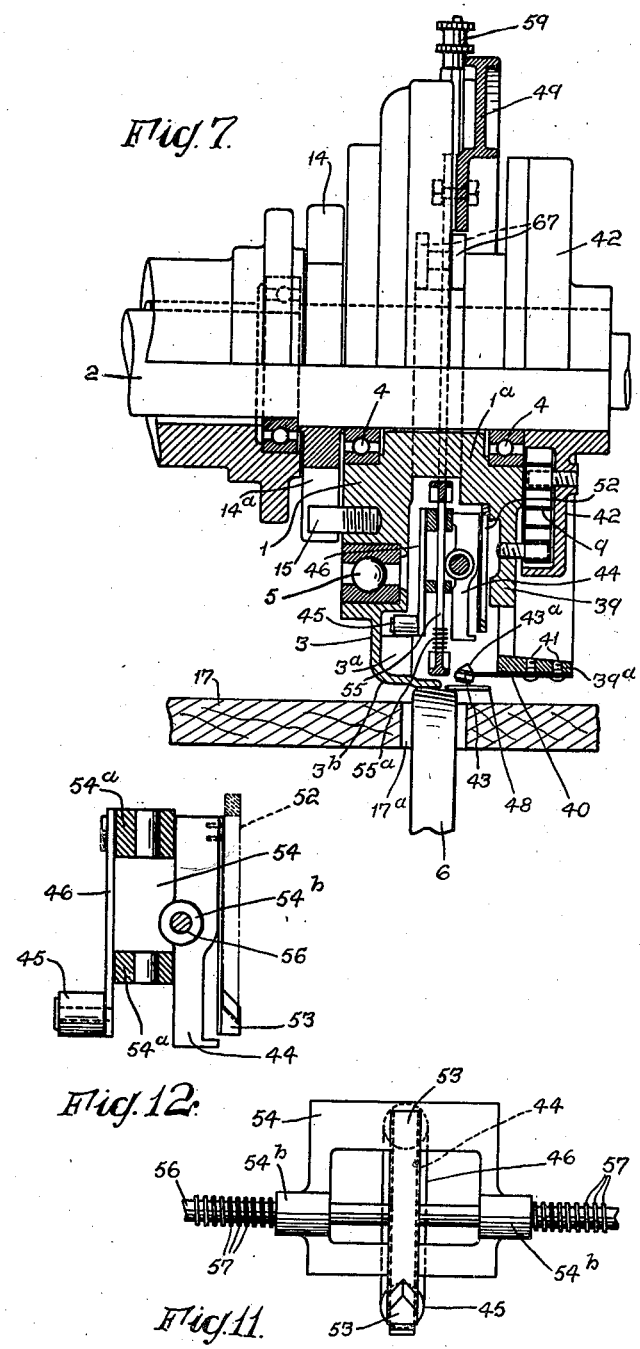
Inventors:
Kenneth L. Wilson and Evan G. Wilson.
By William C. Linton
Atty.

Dec. 30, 1941.　　　E. G. WILSON ET AL　　　2,268,521
THICKNESS MEASURING DEVICE
Filed Jan. 29, 1938　　　7 Sheets-Sheet 7
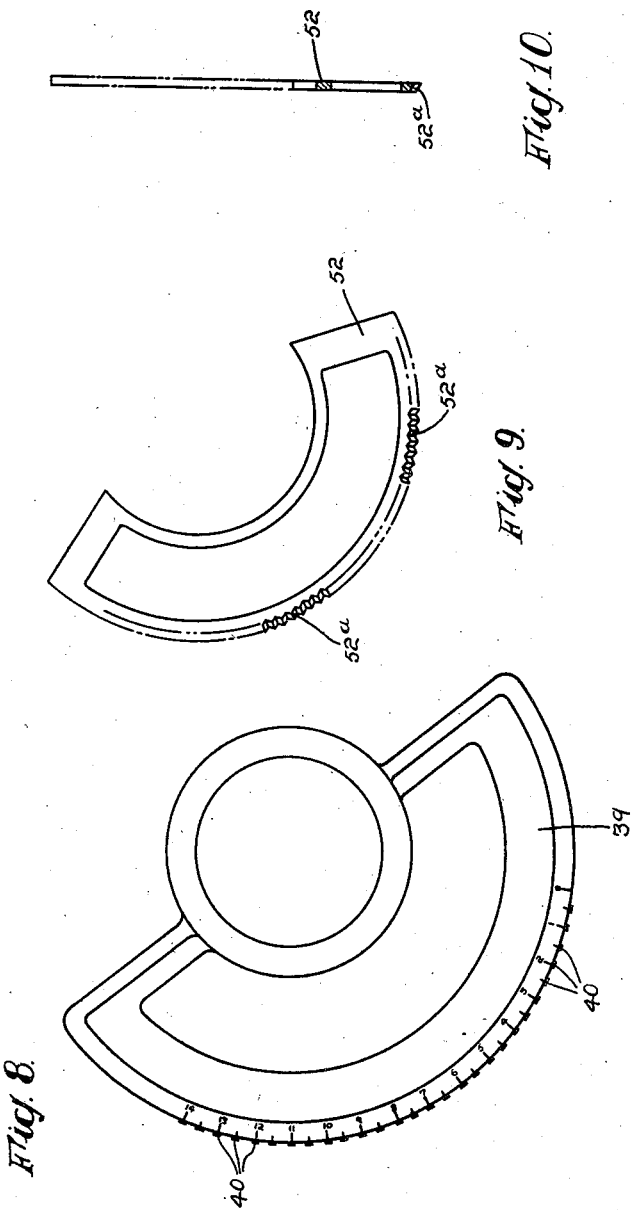
Inventors:
Kenneth L. Wilson & Evan G. Wilson.
By William C. Linton
Atty.

Patented Dec. 30, 1941

2,268,521

UNITED STATES PATENT OFFICE 2,268,521

THICKNESS MEASURING DEVICE

Evan George Wilson and Kenneth Lethbridge Wilson, Blundellsands, near Liverpool, England Application January 29, 1938, Serial No. 187,742
In Great Britain January 30, 1937

12 Claims. (Cl. 33—148)

This invention relates to apparatus for measuring the thicknesses of leather or other materials or substances in sheet or strip form (all hereinafter for convenience of reference designated "leather") of the kind in which a cam or eccentric surface is rotated to engage the sheet and, according to its angular movement from a datum or zero point, registers the thickness of the sheet. Our invention is particularly concerned with the measuring of sheets—such as the sole leather used in the manufacture of boots and shoes—the thickness of which differs appreciably at various parts throughout the area of a sheet.

The aim of the present invention is to provide a simple and reliable measuring apparatus possessing certain advantageous and novel features which will become apparent as the invention is further described.

Our measuring apparatus may also embody—to operate in conjunction therewith and so as to agree with the scale or indicator, if provided—improved marking or stamping mechanism whereby there may be recorded or printed on the surface of a sheet, markings which indicate the various thicknesses of the leather, so that in the case of sole leather the ascertainment of the varying thicknesses may be obtained by mere inspection of the surface of the leather, which is of substantial advantage to manufacturers as it obviates accumulation of stocks of unwanted thicknesses.

The marking or stamping mechanism, as embodied in apparatus according to this invention, effects the marking of the leather in clear and uniform characters or prints which are always, as far as practicable, of the same strength in relative appearance one with another. Moreover, through the use of said marking or stamping mechanism, no pre-inking—as is necessary in previous measuring and stamping machines—is required. Further, the measuring apparatus with stamping mechanism, if provided, does not operate when there is no leather passing thereunder, even though a lower feeding roller may be continuously driven by power, or when such a roller is driven by hand.

A further advantage resides in that the marking or stamping mechanism cannot inadvertently operate upon the front or leading edge of the leather, which disadvantage often causes breakage and stoppage of known machines embodying marking or stamping implements.

Apparatus, according to our invention, for measuring the varying thicknesses of leather and other materials or substances in sheet or strip form, comprises or includes a "feeler" device having a circular wedge or eccentric body turnable on an axis, such as a shaft about which it revolves; a disc, feeding roller, table, or other surface; an anti-friction device interposed between said "feeler" device and said disc, feeding roller, table, or other surface, and presenting a contact face adapted to move with a sheet or strip to be measured when the latter is passing between said "feeler" device and said disc, feeding roller, table, or other surface, irrespective of the measuring displacements of said "feeler" device; and a scale, indicator, or stamping or marking mechanism operatively associated with and adapted to indicate the measuring displacements of said "feeler" device.

One form of apparatus in accordance with our invention comprises or includes a "feeler" device having a circular wedge or eccentric body mounted upon, so as to be turnable about, a shaft or axis; spring or other means tending to rotate said wedge or body in one direction so as to maintain a constant pressure of the feeler device upon the substance; a pointer connected with said wedge or body so as to follow the measuring displacements thereof; a stationary scale or indicator graduated in accordance with the degree of eccentricity of said wedge or body and over which said pointer operates; and a lower roller, table or other support disposed below said feeler device: the arrangement being such that when a sheet of substance is passed between said circular wedge or eccentric body and said lower roller, table or other support, said wedge or body is caused to turn or oscillate about its shaft or axis and so that the lowermost portion of the wedge or body rises or falls in accordance with the varying thicknesses of the leather in order to impart corresponding indications to the pointer which follows the measuring movements of the eccentric body for comparison with the scale or indicator.

In a converse arrangement, said scale or indicator is connected with said wedge or body so as to follow the measuring displacements thereof and said pointer or its equivalent is stationary.

Said circular wedge or eccentric body has its outer periphery formed as a true circle and fitted with a ball bearing race carrying a loose outer or slip ring which contacts with the substance and is rotated as and when the same is travelling thereunder, whilst another ball bearing race is fitted between said circular wedge or eccentric body and the shaft or axis about which it oscillates.

Another form of apparatus in accordance with our invention comprises or includes a body eccentrically mounted upon so as to be turnable about an axis, such as a shaft about which said body revolves; a loose outer or slip ring disposed about the outer periphery of said eccentric body and which periphery is formed as a true circle; a ball bearing race interposed between said periphery and said outer loose or slip ring; a stamp carrying sector or equivalent carrier rigidly or otherwise connected with said eccentric body so as to follow the movement thereof; a series of predeterminedly spaced flexible arms of spring metal each of which are anchored to said sector or carrier and extend laterally beyond the edge thereof toward said slip ring; a type block bearing a character of a thickness reading carried at the free end of each spring arm so as to be in proximity with the point of contact of said slip ring with the substance; a type ribbon passing below said type blocks; a series of radially arranged cams or inclined surfaces spaced around said slip ring; means connected with said eccentric body to maintain a constant pressure of said slip ring upon the leather; a striker member or hammer device vertically mounted between said slip ring and stamp sector or carrier and operatively connected with the slip ring by a roller or other member on the striker member or hammer being adapted to successively engage said cams or inclined surfaces when the feeler wheel slip ring is revolving; and said striker member or hammer being spring loaded or returned so that when its roller or member rides up each of the cams or inclined surfaces the spring stores up energy until said roller or member leaves the topmost point of a cam or inclined surface whereupon the striker member or hammer is forced downwardly by said spring to engage with a type block of the sector or carrier which is thereby forced into contact with the type ribbon and then with the substance.

Other features appertaining to our apparatus will become apparent in the following description and claims concluding this specification.

We will further describe our invention with the aid of the accompanying sheets of explanatory drawings which illustrate by way of examples only, two modes of carrying the invention into effect.

In said drawings:

Figs. 1, 2 and 3 are front, side and rear elevations, respectively, of apparatus in the form of a machine constructed in accordance with our invention and for the purpose of effecting the measuring of the varying thicknesses of leather for visual observation only, no stamping or marking mechanism being embodied; and Figs. 4 and 5 are front and side elevations, respectively, both in part section, of a fragment of the machine but drawn to an enlarged scale as compared with the preceding views and showing a sheet of leather passing through the machine.

Figs. 6 and 7 are front and side elevations, respectively, both in part section, of a machine or apparatus including the characteristic features appertaining to the machine shown in the preceding Figs. 1 to 5, but of slightly modified construction and incorporating marking or stamping mechanism whereby the various thicknesses of the leather are printed on the surface thereof; and Figs. 8 to 12, inclusive, are detail views of parts of the stamping mechanism detached.

In the several views like characters of reference denote like or equivalent parts wherever they occur.

Referring to the drawings and first with more particular reference to the machine depicted in Figs. 1 to 5 inclusive, a circular body or cam disc designated 1 is eccentrically mounted upon so as to revolve about a fixed axis, such as a shaft 2, and carries an outer loose or slip ring 3. A ball-bearing race (or races) 4—see Figs. 4 and 5—is disposed between shaft 2 and the bore of eccentric body 1 and another larger ball-bearing race 5 is fitted between the outer periphery—which is formed as a true circle—of eccentric body 1 and outer slip ring 3. The whole assembly just described constitutes a feeler wheel having an eccentric or circular wedge-like motion and is situated directly above and in alignment with a lower feeling roller 6 mounted to revolve about an axle portion 7a of a shaft 7; ball-races 8 are fitted around axle portion 7a. Rotary motion may be imparted to lower feeling roller 6 to cause the latter to function as a feeding roller for the leather. Alternatively, tubes slidable on a grid-like table or support may be fitted in lieu of said lower feeling roller 6.

The purpose of the ball-race 5 is to permit slip ring 3 to freely revolve about the circular periphery of eccentric body 1 as the leather is passed beneath said slip ring and this irrespective of the measuring movements or displacements of eccentric body 1 as hereinafter described, thus eliminating frictional or rubbing contact as would be the case if eccentric body 1 directly operated upon the leather.

A coiled plate spring 9 fitted between guard discs 10, 10a has the ends of its outer and inner convolutions suitably anchored by discs 10, 10a in such manner that said spring 9, by tending at all times to impart rotary motion to eccentric body 1 in the direction of the arrow A, Fig. 4, tends to maintain slip ring 3 of the upper feeler wheel assembly in contact wtih the lower feeling roller 6, or to maintain a uniform pressure upon the leather when the same is passing between the feeler wheel assembly and lower roller 6, or with a stop or abutment on the shaft 2 as later described.

To the eccentric body 1 there is secured a pointer 11 which extends beyond the outer edge of eccentric body 1 and operates over a stationary scale or indicator 12 marked or graduated according to the degree of eccentricity of body 1 of the feeler wheel assembly; the arrangement being such that when the feeler wheel assembly is in contact with the lower feeling roller 6—the eccentric body 1 having been revolved about shaft 2 by spring 9 to its lowermost position—a zero reading is indicated by pointer 11 on scale 12, and upon a sheet of leather 13 being passed—in the direction of arrow B Fig. 4—between the outer slip ring 3 of the upper feeler wheel assembly and lower feeling roller 6, said outer slip ring 3 will be caused to rotate and in doing so will rise and fall, owing to the eccentricity of its inner body 1 which revolves or oscillates about shaft 2 in accordance with the varying thicknesses of the leather and due to the influence of spring 9, such thicknesses being transmitted to the scale or indicator 12 for observation consequent on the pointer 11 following the measuring or gauging movements or displacements of the inner eccentric body 1 Thus direct magnification of variation of the leather may be obtained according to the radius of the eccentric body in relation to its degree of eccentricity.

A collar 14 carrying a stop or abutment 14ª is adjustably secured on shaft 2 for engagement with a projection, such as pin 15, on eccentric body 1 so as to ensure that body 1 is resting at a zero or other position corresponding to and in agreement with the thickness of the leather; with such a stop arrangement 14, 14ª and 15 it is not necessary to lower the feeler wheel assembly into direct contact with the lower feeling roller 6 when adjusting a zero or other reading on the scale.

Said upper feeler wheel assembly and lower feeling roller 6 are, in the example illustrated, somewhat narrow in width and are mounted in vertical alignment and at right angles to the respective arm extremities 16ª, 16ᵇ of a C shaped frame 16 between which a table or like support 17 for the leather is situated; said table 17 being secured to the flat top of arm 16ᵇ. The feeler wheel assembly is enclosed within a casing formed in two half portions 18, 18ª secured together at 19 and providing an opening 18ᵇ at the bottom wherethrough the feeler wheel slip ring 3 protrudes: an upper portion of said lower feeling roller 6 extends somewhat through a slot 17ª formed in table 17 so as to protrude a small distance above the upper surface thereof. A window 20 is provided in casing portion 18 for observing the movements of pointer 11 over scale 12.

Disc 10, to which the end of the outer convolution of spring 9 is anchored, is stationary with casing portion 18ª whilst disc 10ª, to which the end of the inner convolution of spring 9 is anchored, is secured to eccentric body 1 so as to revolve the same as before described.

The upper frame 16, 16ª, 16ᵇ is mounted by bolts 21 upon a base or stand 22.

Shaft 2 extends through the hollow interior of upper arm 16ª of frame 16 and to the rear end of said shaft there is secured a gear wheel 23 which engages with a toothed quadrant 24 fulcrumed at 25 and having an arm portion 24ª connected with a dash-pot 26. Quadrant 24 is pivotally connected by means of an eccentric pin 27 to a vertical link 28 which has its lower end pivotally connected with a foot treadle 29 pivoted at 30 to the base of stand 22; the arrangement being such that upon treadle 29 being pressed downwardly the vertical link 28 turns quadrant 24 about fulcrum 25 to impart rotary motion to gear wheel 23 and so shaft 2 which, in turn, and due to the stop 14ª of collar 14 engaging with the pin 15 of eccentric body 1, revolves the latter against the resistance of spring 9 so as to raise the eccentric feeler wheel assembly from engagement with the lower roller 6 or from the leather 13, as the case may be.

Link 28 may be lengthened or shortened so as to vary the stroke of treadle 29 by a screw-adjusting member 28ª.

When treadle 29 is released the eccentric body 1 is returned to its lowermost position by the action of spring 9 so that pointer 11 moves towards the zero position. In this return movement, the dash-pot 26 has a uniformly braking effect on the parts connected therewith. Alternatively, the feeler wheel assembly may be raised as before described by revolving shaft 2 by means of a suitable handle, such as 31, fitted at the front of said shaft.

The feeler wheel assembly may be held in its raised position by means of a spring-returned pawl 32 engaging a toothed wheel 33 in mesh with a toothed wheel 34 fixed at the rear of shaft 2, as shown in Fig. 3.

When the feeler wheel assembly is raised the leading edge of the leather may be readily passed between the slip ring 3 and lower roller 6 whereupon the feeler wheel assembly may be lowered into contact with the leather.

The lower feeling roller 6 is also preferably adjustable in height in order to pre-set or correct the zero reading of the scale or indicator 11, 12, and in the example illustrated, this is effected by the axle portion 7ª of shaft 7 having an eccentric motion, such as indicated at 35 Fig. 4, in its bearing so that upon a handle 36 secured to the rear of shaft 7 being revolved in one direction or the other, the roller 6 is raised or lowered. The movement of handle 36 is restricted by a pin 37 affixed to handle 36 engaging in an arc-shaped slot 38ª in a vertical arm 38ᵇ of a bearing bracket 38, carrying shaft 7, 7ª, extending from below arm 16ᵇ of frame 16.

The respective ball-bearing races 4 and 5 eliminate friction and wear during operation of the parts, but it will be obvious that other anti-friction devices may be devised and employed; for instance, in lieu of the ball race 5 and slip ring 3 a small roller may be directly interposed between the eccentric or cam body 1 and the leather 13 in such manner as to freely rotate as the leather is passing thereunder and at the same time rise and fall in accordance with the various thicknesses of the leather so as to transmit such measuring movements to said eccentric or cam body 1 which, in turn, moves the pointer 11 over the scale 12 correspondingly.

In cases where finer distinctions between sheets of leather greater in thickness than the degree of eccentricity of the feeler wheel assembly are required, a similar eccentric may be used in lieu of the concentric lower feeler disc 6, rather than by increasing the outer diameter of the upper eccentric body 1 and thus magnifying its scale. In this manner, two discs, the top disc, for example, having only ⅛" eccentricity and the lower disc ⅜" eccentricity will—provided the latter disc is set to its lowermost position—permit a reading of three times the magnification of sheets measuring between ⅜" and ½" in thickness. Means may be provided for mechanically turning a loose ring on the outer diameter of the bottom eccentric (or of the top eccentric, or even both) if it be desired to pass the leather through continuously. In such cases, the known displacement of the bottom disc is added to the measurement shown on the dial or indicator of the top disc. Alternatively, dials or indicators may be used on both top and bottom discs for use as described.

The embodiment of the invention shown in Figs. 6 to 12, inclusive, operates in a manner substantially similar as in the apparatus just described, with the exception that certain parts of the apparatus of Figs. 6 to 12 are modified in shape and arrangement so as to incorporate marking or stamping mechanism in lieu of or in addition to the indicator 11, 12 of the previous construction whereby the various thicknesses are printed or recorded on the surface of the leather; in these views the periphery of an indicator or marking wheel 39—which in this example is in the form of a quadrant or sector (shown detached in Fig. 8) cast integral with a boss 1ª of eccentric body 1 so as to be movable therewith as in the case of pointer 11 of the previous construction—is provided with a series of predeterminedly spaced flexible arms of spring metal each of which is designated 40 and are anchored by screws 41 to a flange 39ª of quadrant 39. Said flexible arms 40 extend laterally beyond the inner edge of flange 39ª towards the slip ring 3 of the eccentric feeler wheel assembly. The boss 1ª of eccentric body 1 is corresponding in eccentricity to that of body 1 whilst quadrant 39 is concentric with the outer periphery of the latter.

The eccentric body 1 carries a pin 15 which is adapted to abut against a stop 14ª of an adjustable collar 14 fixed to shaft 2, whilst the quadrant 39 at the other side of eccentric body 1 and rigid with intermediate integral boss 1ª, has fitted thereto a hub cap 42 which contains a coiled spring 9 arranged to normally tend to maintain the eccentric body 1 in its lowermost position with its pin 15 in abutment with the stop 14ª fixed to shaft 2; this stop arrangement being similar to that before described.

The outermost free end of each spring arm 40 carries a type block 43 bearing on its underside a character of a thickness reading, for example, a numeral denoting a number of millimeters and/or fractions thereof, whilst the upper face of the type block 43 carries or is formed with a conical head member 43ª.

The outer loose or slip ring 3 of the eccentric feeler wheel is provided with a series of radially arranged cams or inclined surfaces, such as 3ª, spaced equidistantly around the side of the slip ring which confronts the type carrier quadrant 39, whilst vertically mounted between said slip ring 3 and quadrant 39 is a striker member or hammer device 44—shown detached in Figs. 11 and 12—operatively connected to the slip ring 3 by a member, such as a roller 45, mounted at the lower end of a vertical arm 46 secured at the rear of hammer 44, and which roller 45 is adapted to successively engage with said cam surfaces 3ª during rotary motion of the feeler wheel slip ring 3.

The striker or hammer device 44 is spring-loaded or returned, such as by the fitment as hereinafter described of a coiled spring 47, so that when the roller 45 rides up each of the cams or inclined surfaces 3ª said spring 47 is tensioned to store up energy until roller 45 leaves the topmost point of the cam surface 3ª, whereupon the striker or hammer device 44 is forced downwardly by spring 47 and engages with the coned head 43ª of a type block 43 which is thereby forced into contact with a type ribbon 48 and then with the leather so that a thickness marking is printed thereon.

Carried by arms 49ª, 49ᵇ of a bow-shaped frame 49 straddling the upper half of the feeler wheel assembly is a pair of spaced spools 50, 51 whereon is wound the type-ribbon 48 which is passed from spool to spool by guides 49ᶜ to pass under the striker or hammer device 44 and the type blocks 43 so that when the spring-loaded striker member 44 forces a spring arm 40 with its type block 43 against the ribbon 48 a clear thickness reading is imprinted upon the surface of the leather. In one revolution of the feeler wheel slip ring 3 the selected spring arms 40—which have been brought under the striker or hammer device 44 due to quadrant 39 following the measuring movement of the eccentric body 1—carrying the type blocks 43 are successively forced upon the leather in accordance with the number of cam surfaces 3ª actuating hammer 44 and the varying thicknesses of the leather.

For the purpose of ensuring that each type block 43 of the spring arms 40 is floated in correct position to be forced flatly upon the leather 13 by the striker or hammer 44, a locating plate 52—shown detached in Figs. 9 and 10—is fixed to the type-carrying quadrant 39 so as to be concentric therewith and has V shaped teeth or recesses 52ª for engagement with a correspondingly shaped member 53 carried by striker or hammer 44, the centre of each tooth 52ª being in radial alignment with the centre of a registering type block 43; the arrangement being such that when striker or hammer 44 is moved upwardly by reason of its roller 45 engaging with a cam surface 3ª of eccentric feeler wheel slip ring 3 as before described, the centring member 53 on striker or hammer 44 engages between adjacent teeth 52ª of locating plate 52 secured to the type-carrying quadrant 39, such a centring arrangement automatically adjusts hammer 44 to the nearest thickness reading of the selected type block 43 which is thus moved into position to be pressed flatly upon the leather on the spring-returned descent of hammer 44 when its roller 45 rides off the edge of a cam surface 3ª.

The striker or hammer 44 is, in the apparatus illustrated, carried by a bracket 54 having aligned apertured bosses 54ª slidable on a vertical rod or spindle 55, whilst said bracket 54 with striker or hammer 44 is mounted for sidewise movement by apertured bosses 54ᵇ of bracket 54 engaging with a horizontal spindle or rod 56 against the resistance of oppositely disposed springs 57 in order to permit hammer or striker 44 to move sidewise in one direction or the other when its centring member 53 is engaging between adjacent teeth 52ª of locating plate 52. The lower end of rod 55 is fitted with a buffer spring 55ª for engagement with the bottom of hammer bracket 54.

In order that the stamping of the leather shall be effected in the closest practicable proximity to the point of measuring, i. e. the point where slip ring 3 of the eccentric feeler wheel assembly contacts with the leather, the outer loose or slip ring 3 is in the form of a hollow dished or flanged collar, as indicated at 3ᵇ Fig. 7, in order to accommodate the cams or inclined surfaces 3ª before referred to and adjacent parts of the stamping mechanism. This feature also permits the type-carrying quadrant or sector 39 to be placed nearer to the point of feeling.

A screwed rod 58 fitted with a milled nut 59 is provided for adjusting the blow of the stamping hammer or striker 44 by varying the tension on the coiled spring 47 associated with said hammer by the aid of a suitable lever device 60 connected with said screwed rod 58 and the lower end of spring 47.

One of the spools—in this case spool 51—for the type-ribbon 48 may be automatically wound by a pawl 61 and ratchet wheel device 61ª adapted to rotate the spool 51 and so spool 50—due to the travelling ribbon 48—a step or one tooth of the ratchet wheel 61ª as the hammer 44 rises. An operative connection between the hammer bracket 54 and the pawl device 61 may be effected by means of a bell-crank lever 62 which has one arm 62ª resting on top of, so as to be actuated by, the hammer bracket 54 due to the upper end of spring 47 being anchored to arm 62ª: with this arrangement, as the hammer 44 rises against the resistance of spring 47 it operates the spool wheel 61ª by means of pivotal links 63 connecting the pawl 61 with an arm of the bell-crank lever 62.

The bow-shaped frame 49 which carries the spools 50, 51 and also the guide 49ᶜ for the ribbon 48 may have one of its arms 49ᵇ pivotally anchored about a shaft or spindle 64 whilst its other arm 49ᵃ may be slidable in guide lugs 65 affixed to a shaft 66, the frame 49 being maintained in a position of rest by means of a roller or a pair of rollers 67 secured centrally on the bow frame 49 engaging with the top of boss 1ᵃ situated between the eccentric body 1 and type-carrying quadrant 39. This arrangement maintains the bottom of the hammer bracket 54 always at the same distance from the bottom of the feeler wheel assembly.

Various alterations or modifications may be made without departure from this invention; for instance, any desired number of stampings upon the leather may be obtained in one complete revolution of the outer loose or slip ring 3 of the feeler wheel, by the provision of more or less cam or inclined surfaces 3ᵃ, or equivalent radially arranged members for operative engagement with roller 45 of the hammer or striker member 44 of the stamping mechanism.

Moreover, instead of a pointer 11 being directly connected with the eccentric or cam body 1 to move it over the stationary dial or scale 12—as in Figs. 1 to 5—the dial and pointer may be mounted above the eccentric feeler wheel, and an operative connection between the pointer 11 and eccentric or cam body 1 may be effected by means of a cord, chain, or the like, which may be endless.

It will also be obvious that further magnification—in respect to our measuring apparatus shown in Figs. 1 to 5—of the variation in thickness of the leather may be obtained by enlarging the diameter of the scale readings or graduations and lengthening the pointer correspondingly.

Furthermore, it is to be understood that whilst our invention has, mainly for convenience of description, been described with reference to a single upper eccentric feeler wheel and lower roller or its equivalent without and with associated stamping mechanism, a plurality of feeler wheels, without or with their respective stamping mechanism, may be mounted to independently operate in parallel upon a common shaft or axis such as shaft 2 substantially as hereinbefore described. It is also to be understood that we do not wish to confine ourselves to the mounting of our eccentric feeler wheel assembly as shown by the apparatus of Figs. 1 to 5, or Figs. 6 to 12, above a point such as a lower roller, table, or other supporting surface; for example, we may mount our eccentric feeler wheel assembly directly below an upper roller or other surface or abutment, or at a side of such surface or abutment, but in all cases the leather will pass between the eccentric feeler assembly and roller or other surface to operate the eccentric feeler assembly substantially as before described.

What we claim as our invention and desire to secure by Letters Patent is:

1. Apparatus for measuring the varying thicknesses of leather and other materials or substances in sheet or strip form, comprising a feeler device having a body encircling and being eccentrically mounted on an axis for rotation thereabout, a table, an antifriction device interposed between said feeler device and said table being rotatably and concentrically mounted upon said body and presenting a contact face adapted to move with a sheet or strip to be measured when the latter is passing between said feeler device and said table irrespective of the measuring displacements of said feeler device, and a marking mechanism operatively associated with and adapted to indicate the measuring displacements of said feeler device.

2. Apparatus as claimed in claim 1, and fitted with means for raising and lowering the eccentric feeler device as and when required.

3. Apparatus as claimed in claim 1, wherein said eccentric feeler device and a lower feeling roller are narrow in width and are mounted in vertical alignment on the respective arm extremities of a C-shaped frame between which a table for the substance is situated.

4. Apparatus for measuring the varying thicknesses of leather and other materials or substances in sheet or strip form, which includes a feeler device having a circular member eccentrically mounted upon, so as to be turnable about, a shaft, a disc positioned beneath said circular member, an anti-friction device interposed between said feeler device and said disc and presenting a contact face adapted to move with a sheet or strip to be measured when the latter is passing between said feeler device and said disc irrespective of the measuring displacements of said feeler device, resilient means tending to rotate said circular member in one direction so as to maintain a constant pressure of the feeler device upon the substance, a stamp-carrying sector rigidly connected with said circular member so as to follow the measuring displacements thereof, a series of type blocks carried by said sector and arranged in value in accordance with the degree of eccentricity of said member, a striker member mounted between said feeler device and said stamp sector, means between said feeler device and striker member for actuating the striker member or during rotation of the feeler device as the substance is passing thereunder so that one or other of the type blocks which has been moved in proximity with the point of contact of the feeler device with the substance is printed upon the surface thereof.

5. Apparatus for measuring the varying thicknesses of leather and other materials or substances in sheet or strip form, comprising a body eccentrically and rotatably mounted upon an axis, a slip ring disposed about the outer periphery of said eccentric body and which periphery is formed as a true circle, a ball bearing race interposed between said body periphery and said slip ring, a stamp-carrying sector connected with said eccentric body so as to follow the movement thereof, a series of predeterminedly spaced flexible arms of spring metal each of which are anchored to said sector and extend laterally beyond the edge thereof toward said slip ring, a type block bearing a character of a thickness reading carried at the free end of each spring arm so as to be in proximity with the point of contact of said slip ring with the substance, a type ribbon passing below said type blocks, a series of radially arranged cams spaced around said slip rings, means connected with said eccentric body to maintain a constant pressure of said slip ring upon the leather, a striker member vertically mounted between said slip ring and stamp sector and operatively connected with the slip ring by a roller on the striker member being adapted to successively engage said cams when the feeler wheel slip ring is revolving, and said striker member being spring-loaded so that when its roller rides up each of the cams the spring stores up energy until said roller leaves the topmost point of a cam whereupon the striker member is forced downwardly by said spring to engage with a type block of the sector which is thereby forced into contact with the type ribbon and then with the substance.

6. Apparatus as claimed in claim 5, wherein said type ribbon is carried by spaced spools and is guided from spool to spool so as to pass under the striker member and the type blocks.

7. Apparatus as claimed in claim 5, wherein centering means is provided between the type block sector and the striker member to align a type block preparatory to downward movement of the striker member so that when the spring-loaded striker member is forced into engagement with the aligned type block a clear thickness reading is imprinted upon the surface of the leather.

8. Apparatus as claimed in claim 5, wherein means is provided for adjusting the blow of the hammer by varying the tension of its spring.

9. Apparatus for measuring the varying thicknesses of leather and other materials or substances in sheet or strip form, which comprises a feeler device having a body eccentrically mounted upon an axis for rotation thereabout, said body having a projection carried thereby, an adjustable stop mounted on said axis, resilient means tending to rotate said body in the direction of said adjustable stop in order to ensure that the feeler device is resting at a pre-set position, a pointer connected with said body so as to follow the measuring displacements thereof, a stationary indicator graduated in accordance with the degree of eccentricity of said body and over which said pointer operates, a table disposed below said feeler device and an anti-friction device interposed between said feeler device and said table being rotatably and concentrically mounted on said body and presenting a contact face adapted to move with a sheet or strip to be measured when the latter is passing between said feeler device and said table irrespective of the measuring displacements of said feeler device.

10. Apparatus as claimed in claim 5 wherein said type sector is provided with a concentric locating plate fixed thereto, said striker member having a concentric locating plate fixedly connected thereto, both of said locating plates being formed with V-shaped teeth for engagement with one another, and the center of each tooth being in radial alignment with the center of a respective type block.

11. Apparatus as claimed in claim 5, wherein said type ribbon is carried by spaced spools, means for guiding said ribbon from spool to spool so as to pass under the striker member and the type blocks and a pawl and ratchet mechanism connected to one of said spools for rotating said spool one tooth of the ratchet as the hammer member rises.

12. Apparatus as claimed in claim 5, wherein said type ribbon is carried by spaced spools, a bow-shaped frame carrying said spools and guiding means for leading said type ribbon from spool to spool so as to pass under the striker member and the type blocks and having one of its arms pivotally anchored and its other arm slidable in a guide.

EVAN GEORGE WILSON.
KENNETH LETHBRIDGE WILSON.